(12) United States Patent
Xu

(10) Patent No.: US 11,503,531 B2
(45) Date of Patent: Nov. 15, 2022

(54) CONTROL DATA TRANSMISSION METHOD AND NETWORK DEVICE AND STORAGE MEDIUM

(71) Applicant: GUANGDONG OPPO MOBILE TELECOMMUNICATIONS CORP., LTD., Guangdong (CN)

(72) Inventor: Yang Xu, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 113 days.

(21) Appl. No.: 17/035,532

(22) Filed: Sep. 28, 2020

(65) Prior Publication Data

US 2021/0014767 A1 Jan. 14, 2021

Related U.S. Application Data

(63) Continuation of application No. PCT/CN2019/080636, filed on Mar. 29, 2019.

(30) Foreign Application Priority Data

Sep. 29, 2018 (WO) ................ PCT/CN2018/108836

(51) Int. Cl.
*H04W 40/12* (2009.01)
*H04L 67/14* (2022.01)
*H04W 28/02* (2009.01)
*H04W 72/04* (2009.01)
*H04W 72/12* (2009.01)

(52) U.S. Cl.
CPC ............ *H04W 40/12* (2013.01); *H04L 67/14* (2013.01); *H04W 28/0278* (2013.01); *H04W 72/0446* (2013.01); *H04W 72/1284* (2013.01); *H04W 72/1289* (2013.01)

(58) Field of Classification Search
None
See application file for complete search history.

(56) References Cited

U.S. PATENT DOCUMENTS

2018/0270699 A1    9/2018  Babaei et al.
2020/0107339 A1*   4/2020  Prakash ............ H04W 28/0268
2020/0374741 A1*  11/2020  Li ........................ H04W 28/24

FOREIGN PATENT DOCUMENTS

CN    106230742 A    12/2016
CN    106304377 A     1/2017
CN    106851769 A     6/2017
(Continued)

OTHER PUBLICATIONS

Nokia, Nokia Shanghai Bell. "23.501 /S 6.3.3: Location Data SMF Needs for UPF Selection" SA WG2 Meeting #124 S2-179779, Dec. 1, 2017 (Dec. 1, 2017), pp. 1-3.
(Continued)

*Primary Examiner* — Jenkey Van
(74) *Attorney, Agent, or Firm* — Perkins Coie LLP

(57) ABSTRACT

A control data transmission method and a network device are provided. The method comprises: a first core network device sending first delay information to a first access network device (S11), wherein the first delay information represents delay in transmitting data on a first path, and the first path is a user plane data path between a second core network device and the first access network device.

18 Claims, 5 Drawing Sheets

(56) References Cited

FOREIGN PATENT DOCUMENTS

| CN | 108337705 A | 7/2018 | | |
|---|---|---|---|---|
| KR | 20190004220 A | 1/2019 | | |
| WO | WO-2018036629 A1 * | 3/2018 | ........ | H04W 72/1284 |
| WO | 2018145103 A1 | 8/2018 | | |
| WO | WO-2018171725 A1 * | 9/2018 | ........... | H04L 5/0053 |

OTHER PUBLICATIONS

International Search Report in the international application No. PCT/CN2019/080636, dated Jul. 8, 2019.
International Search Report in the international application No. PCT/CN2018/108836, dated Jun. 27, 2019.
English translation of the Written Opinion of the International Search Authority in the international application No. PCT/CN2018/108836, dated Jun. 27, 2019 7 pages with English translation.
English translation of the Written Opinion of the International Search Authority in the international application No. PCT/CN2019/080636, dated Jul. 8, 2019. 9 pages with English translation.
Huawei, HiSilicon, "New key issue and solution for the enhancement of PDB provision", 3GPP SA WG2 Meeting #128BIS S2-188231, Aug. 20-24, 2018, Sophia Antipolis, France. 4 pages.
First Office Action of the Chinese application No. 202010688032.0, dated Sep. 28, 2021. 13 pages with English translation.
Nokia, Alcatel-Lucent Shanghai Bell, "TS 23.501: NSSAI abbreviation, Editorial corrections and clean up", 3GPP SA WG2 Meeting #122 S2-175027, Jun. 26-30, 2017, San Jose Del Cabo, Mexico 24 pages.
Supplementary European Search Report in the European application No. 19867907.8, dated Oct. 22, 2021. 9 pages.
Huawei, HiSilicon; "New key issue and solution for the enhancement of PDB provision", SA WG2 Meeting #128BIS, S2-188908, Aug. 20-24, 2018, Sophia Antipolis, France.
First Office Action of the Indian application No. 202117019174, dated Feb. 14, 2022. 7 pages with English translation.
First Office Action of the European application No. 19867907.8, dated Jul. 5, 2022.

* cited by examiner

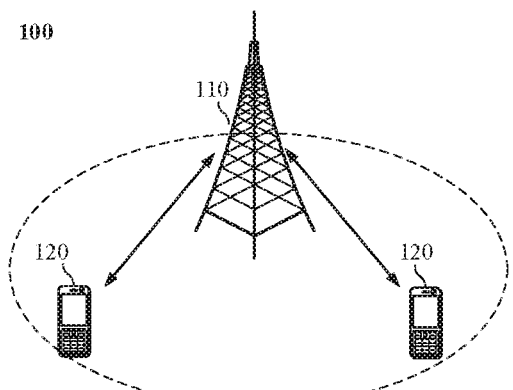

FIG. 1

| A first core network device sends first delay information to a first access network device | — S11 |

FIG. 2

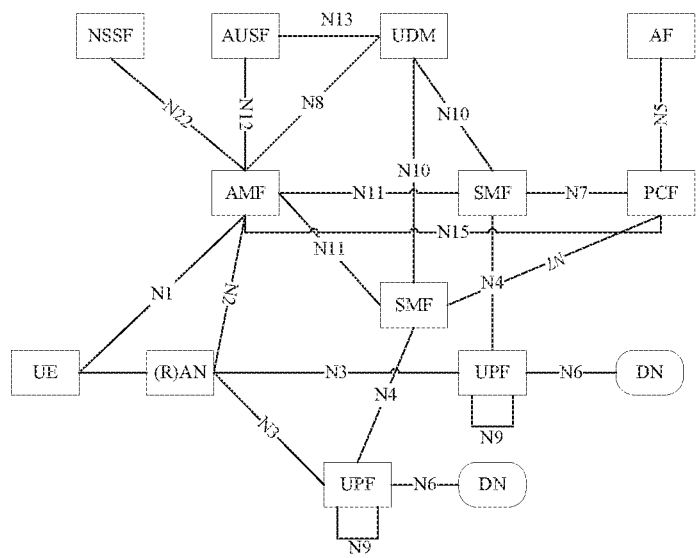

FIG. 3

| A first access network device receives first delay information from a first core network device | — S21 |

| The first access network device determines second delay information according to delay information corresponding to a data flow on the first path and the first delay information | — S22 |

FIG. 4

CONTROL DATA TRANSMISSION METHOD AND NETWORK DEVICE AND STORAGE MEDIUM

CROSS-REFERENCE TO RELATED APPLICATION

This is a continuation application of International Patent Application No. PCT/CN2019/080636, filed on Mar. 29, 2019, which claims priority to International Patent Application No. PCT/CN2018/108836, filed on Sep. 29, 2018, the contents of which are hereby incorporated by reference in their entirety.

BACKGROUND

Quality of service (QoS) parameters include a packet delay budget (PDB), which represents a transmission delay between a user plane function (UPF) and a user equipment (UE). For air interface scheduling, when a base station receives the QoS parameters, the base station subtracts a default value representing a core network transmission delay (the core network transmission delay is a transmission delay between the UPF and the base station) from a PDB value in the QoS parameters, and uses a time obtained through the subtraction as an air interface transmission delay. However, the default value representing the core network transmission delay usually cannot represent an actual transmission delay. For example, a transmission path is sometimes congested while sometimes idle, or distances between the base station and different UPFs are different. Therefore, an accurate air interface transmission delay cannot be obtained in this manner.

SUMMARY

The present disclosure relates to wireless communications technologies, and specifically, to a data transmission control method, which may obtain an air interface transmission delay accurately.

According to a first aspect, a data transmission control method is provided, including: sending, by a first core network device, first delay information to a first access network device, where the first delay information represents a delay in transmitting data on a first path; and the first path is a user plane data path between a second core network device and the first access network device.

According to a second aspect, a data transmission control method is provided, including: receiving, by a first access network device, first delay information from a first core network device, where the first delay information includes an uplink and/or downlink delay in transmitting data on a first path; and the first path is a user plane data path between a second core network device and the first access network device; and determining, by the first access network device, second delay information according to delay information corresponding to a data flow on the first path and the first delay information, where the delay information represents a delay in transmitting data between the second core network device and a terminal device, and the second delay information represents a delay in transmitting data between the first access network device and the terminal device.

According to a third aspect, a core network device is provided, configured to perform the method according to the first aspect or implementations of the first aspect. Specifically, the core network device includes functional modules configured to perform the method according to the first aspect or implementations of the first aspect.

According to a fourth aspect, an access network device is provided, configured to perform the method according to the second aspect or implementations of the second aspect. Specifically, the access network device includes functional modules configured to perform the method according to the second aspect or implementations of the second aspect.

According to a fifth aspect, a device selection method is provided, including: selecting, by a first core network device, a second core network device according to third delay information, where the third delay information represents a delay in transmitting data on a second path; and the second path is a user plane data path between the second core network device and a first access network device, or the second path is a user plane data path between the second core network device and a terminal device.

According to a sixth aspect, a core network device is provided, configured to perform the method according to the fifth aspect or implementations of the fifth aspect. Specifically, the core network device includes functional modules configured to perform the method according to the fifth aspect or implementations of the fifth aspect.

According to a seventh aspect, a core network device is provided, including: a processor, and a memory configured to store a computer program executable on the processor. The processor is configured to perform, when executing the computer program, steps of the method according to the first aspect or implementations of the first aspect, or steps of the method according to the fifth aspect or implementations of the fifth aspect.

According to an eighth aspect, an access network device is provided, including: a processor, and a memory configured to store a computer program executable on the processor. The processor is configured to perform, when executing the computer program, steps of the method according to the second aspect or implementations of the second aspect.

According to a ninth aspect, a chip is provided, configured to perform the method according to any one of the first aspect, the second aspect, or the fifth aspect, or implementations of the first aspect, the second aspect, or the fifth aspect. Specifically, the chip includes a processor, configured to invoke a computer program from a memory and run the computer program, to enable a device having the chip installed therein perform the method according to any one of the first aspect, the second aspect, or the fifth aspect, or implementations of the first aspect, the second aspect, or the fifth aspect.

According to a tenth aspect, a computer readable storage medium is provided, configured to store a computer program. The computer program enables a computer to perform the method according to any one of the first aspect, the second aspect, or the fifth aspect, or implementations of the first aspect, the second aspect, or the fifth aspect.

According to an eleventh aspect, a computer program product is provided, including a computer program instruction. The computer program instruction enables a computer to perform the method according to any one of the first aspect, the second aspect, or the fifth aspect, or implementations of the first aspect, the second aspect, or the fifth aspect.

According to a twelfth aspect, a computer program is provided. The computer program, when run on a computer, enables the computer to perform the method according to any one of the first aspect, the second aspect, or the fifth aspect, or implementations of the first aspect, the second aspect, or the fifth aspect.

Through the technical solutions of the embodiments of this disclosure, the first core network device sends the first delay information representing the delay of the user plane data path between the second core network device and the first access network device to the first access network device, so that the first access network device determines, based on the first delay information, second delay information representing a delay in transmitting data between the first access network device and the terminal device. In this way, an air interface transmission delay that is more close to an actual situation may be obtained, that is, a more accurate schedulable time for air interface transmission may be obtained. In addition, data transmission efficiency may be greatly improved.

BRIEF DESCRIPTION OF THE DRAWINGS

FIG. 1 is a schematic diagram of an architecture of a communications system according to an embodiment of this disclosure;

FIG. 2 is a schematic flowchart of a data transmission control method according to an embodiment of this disclosure;

FIG. 3 is a schematic diagram of a logical relationship of a communications system architecture to which a data transmission control method is applied according to an embodiment of this disclosure;

FIG. 4 is a schematic flowchart of another data transmission control method according to an embodiment of this disclosure;

DETAILED DESCRIPTION

Figure 5A:
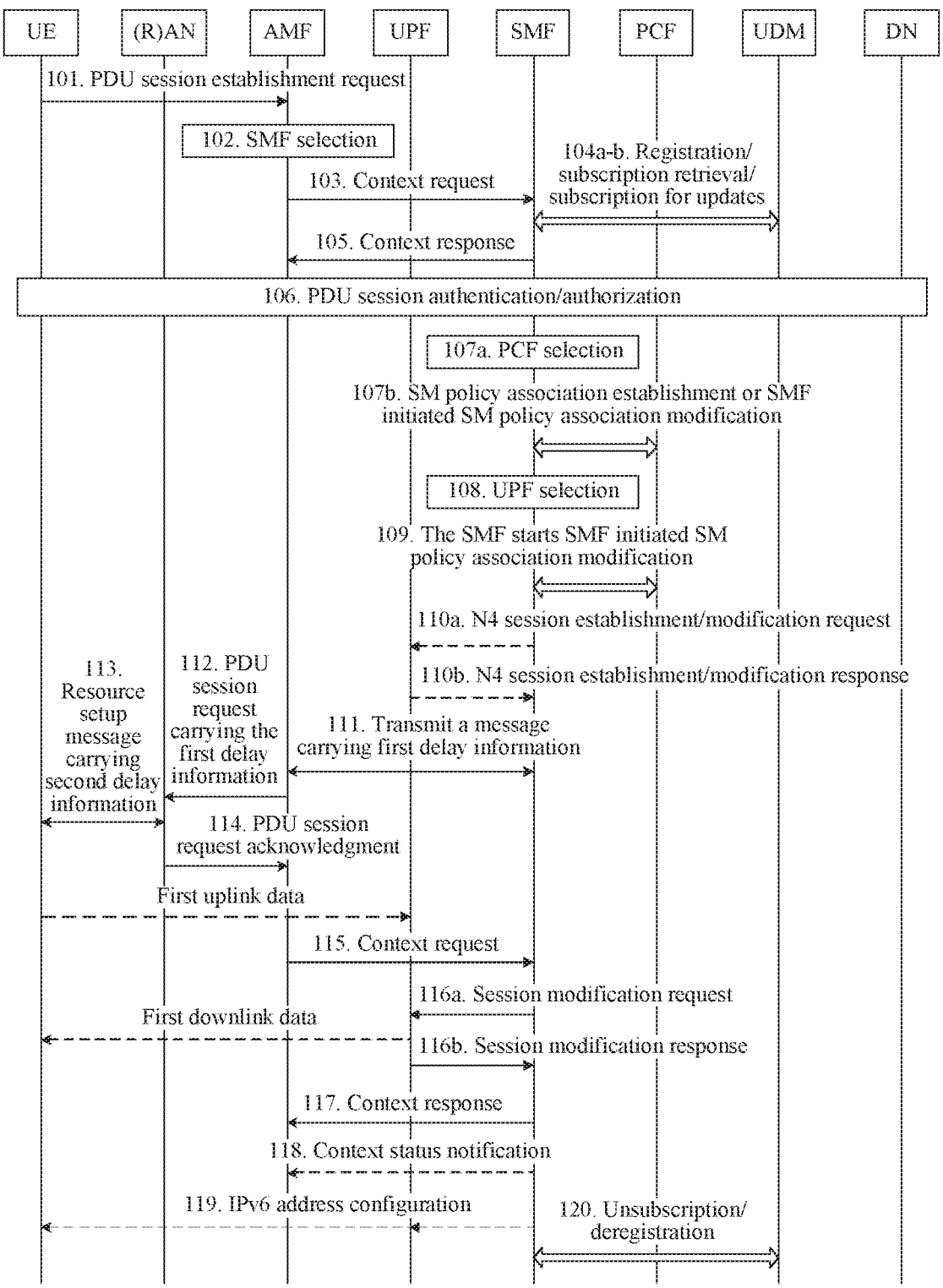
FIG. 5A to FIG. 5C are schematic diagrams of disclosure processes of a data transmission control method according to an embodiment of this disclosure.

The technical solutions of the embodiments of this disclosure will be described in the following with reference to the accompanying drawings. It is obvious that the embodiments to be described are some rather than all of the embodiments of this disclosure. All other embodiments obtained by a person of ordinary skill in the art based on the embodiments of this disclosure without creative efforts shall fall within the protection scope of this disclosure.

The technical solutions in the embodiments of this disclosure may be applied to various communications systems, such as a Global System for Mobile Communications (GSM) system, a Code Division Multiple Access (CDMA) system, a Wideband Code Division Multiple Access (WCDMA) system, a general packet radio service (GPRS), a Long Term Evolution (LTE) system, an LTE frequency division duplex (FDD) system, an LTE time division duplex (TDD) system, a Universal Mobile Telecommunications System (UMTS), a Worldwide Interoperability for Microwave Access (WiMAX) communications system, and a 5G system.

For example, FIG. 1 shows a communications system 100 to which an embodiment of this disclosure is applied. The communications system 100 may include a network device 110. The network device 110 may be a device communicating with a terminal device 120 (or referred to as a communications terminal or a terminal). The network device 110 may provide communication coverage for a specific geographical area, and may communicate with a terminal device that is located in the coverage area. Optionally, the network device 110 may be a base transceiver station (BTS) in a GSM system or a CDMA system, or may be a NodeB (NB) in a WCDMA system, or may be an evolved NodeB (eNB or eNodeB) in an LTE system, or a radio controller in a cloud radio access network (CRAN). Alternatively, the network device may be a mobile switching center, a relay station, an access point, an in-vehicle device, a wearable device, a hub, a switch, a bridge, a router, a network side device in a 5G network, a network device in a future evolved public land mobile network (PLMN), or the like.

The communications system 100 further includes at least one terminal device 120 located within the coverage area of the network device 110. The "terminal device" used herein includes, but is not limited to, being connected through a wired line, for example, connected through a public switched telephone network (PSTN), a digital subscriber line (DSL), a digital cable, or a direct cable, and/or another data connection/network; and/or through a radio interface, for example, a cellular network, a wireless local area network (WLAN), a digital television network such as a DVB-H network, a satellite network, or an AM-FM broadcast transmitter; and/or an apparatus, configured to receive/send a communication signal, of another terminal device; and/or an Internet of Things (IoT) device. A terminal device configured to communicate through a radio interface may be referred to as a "wireless communications terminal", a "wireless terminal", or a "mobile terminal". Examples of the mobile terminal include, but are not limited to, a satellite or cellular phone; or a personal communications system (PCS) terminal combining capabilities of a cellular radio phone, data processing, faxing, and data communication; or a personal digital assistant (PDA) combing capabilities of a radio phone, a pager, Internet/Intranet accessing, a Web browser, a notebook, a calendar, and/or a global positioning system (GPS) receiver; or a common laptop and/or palmtop receiver or another electric apparatus including a radio phone transceiver. The terminal device may be an access terminal, a UE, a user unit, a user station, a mobile station, a mobile console, a remote station, a remote terminal, a mobile device, a user terminal, a terminal, a wireless communications device, a user agent, or a user apparatus. The access terminal may be a cellular phone, a cordless phone, a Session Initiation Protocol (SIP) phone, a wireless local loop (WLL) station, a PDA, a handheld device having a wireless communication function, a computing device, another processing device connected to a wireless modem, an in-vehicle device, a wearable device, a terminal device in a 5G network, a terminal device in a future evolved PLMN, or the like.

Optionally, the terminal devices 120 may perform device to device (D2D) communication with each other.

Optionally, the 5G system or the 5G network may also be referred to as a New Radio (NR) system or an NR network.

FIG. 1 shows one network device and two terminal devices as an example. Optionally, the communications system 100 may include a plurality of network devices and coverage of each network device may include another quantity of terminal devices. This is not limited in this embodiment of this disclosure.

Optionally, the communications system 100 may further include other network entities such as a network controller and a mobility management entity. This is not limited in this embodiment of this disclosure.

It should be understood that, in this embodiment of this disclosure, a device with a communication function in a network/system may be referred to as a communications device. The communications system 100 shown in FIG. 1 is used as an example. The communications device may include a network device 110 and a terminal device 120 that include a communication function. The network device 110 and the terminal device 120 may be specific devices described above. Details are not described herein again. The communications device may further includes another device in the communications system 100, for example, another network entity such as a network controller, a mobile management entity. This is not limited in this embodiment of this disclosure.

It should be understood that, terms "system" and "network" in this specification are usually interchangeably used in this specification. The term "and/or" in this specification is only an association relationship for describing the associated objects, and represents that three relationships may exist, for example, A and/or B may represent the following three cases: A exists separately, both A and B exist, and B exists separately. In addition, the character "/" in this specification generally indicates an "or" relationship between the associated objects.

An embodiment of this disclosure provides a data transmission control method. FIG. 2 is a schematic flowchart of a data transmission control method according to an embodiment of this disclosure. As shown in FIG. 2, the method includes:

Step S11: A first core network device sends first delay information to a first access network device, where the first delay information represents a delay in transmitting data on a first path; and the first path is a user plane data path between a second core network device and the first access network device.

In this embodiment, the first core network device may be any device in a core network. As an implementation, the first core network device may be a session management function (SMF) entity. The first access network device may be any device in an access network. As an implementation, the first access network device may be a base station, for example, a gNB in a 5G system or an NR system.

In this embodiment, the first delay information represents the transmission delay on the first path; and the first path is the user plane data path between the second core network device and the first access network device. As an implementation, the second core network device may be an UPF entity. If the first access network device is a base station, the first path is a data transmission path between the UPF entity and the base station.

In this embodiment, the first delay information includes first uplink delay information and/or first downlink delay information of transmitting data on the first path. If the first path is the data transmission path between the UPF entity and the base station, the first uplink delay information is a delay in transmitting data from the base station to the UPF entity, and the first downlink delay information is a delay in transmitting data from the UPF entity to the base station.

Optionally, the sending, by a first core network device, first delay information to a first access network device includes: sending, by the first core network device, one piece of delay information to the first access network device when the first uplink delay information and the first downlink delay information are the same, where the one piece of delay information represents an uplink transmission delay and a downlink transmission delay in transmitting data on the first path.

It may be understood that, when the first uplink delay information and the first downlink delay information are the same, the first core network device sends only one piece of delay information to the first access network device, where the one piece of delay information represents the delay in transmitting data from the base station to the UPF entity and the delay in transmitting data from the UPF entity to the base station.

In an optional embodiment of this disclosure, before the sending, by a first core network device, first delay information to a first access network device, the method further includes: determining, by the first core network device, the first delay information, where the first delay information is determined according to at least one item of the following information: location information of the second core network device, location information of the first access network device, a network status of the first path, whether the data transmitted on the first path is uplink data or downlink data, a network slice identification and/or a data network name (DNN) corresponding to the data transmitted on the first path, whether there is an intermediate second core network device on the first path, or a subscription policy. The location information of the second core network device is determined based on an identity of the second core network device and/or a data network access identity (DNAI); and the location information of the first access network device is determined based on an identity of the first access network device and/or an identity of a tracking area or a registration area to which the first access network device belongs.

In this embodiment, the first delay information sent by the first core network device to the first access network device is specifically determined according to at least one of parameters: location information of a network element node connected to the first path (including the location information of the second core network device and/or the location information of the first access network device), the network status of the first path, a data type of data transmitted on the first path (the data type specifically indicates that the data is of an uplink data type or a downlink data type), a service feature (specifically represented by a network slice identification and/or a DNN) corresponding to the data transmitted on the first path, whether there is an intermediate second core network device on the first path, or a subscription policy of a terminal user.

The location information of the network element node connected to the first path (including the location information of the second core network device and/or the location information of the first access network device) may be specifically an actual geographic location of the network element node. In an actual disclosure, as an implementation, the actual geographic location of the corresponding network element node may be determined through an identity (an identity of the second core network device and/or an identity of the first access network device) of a network element node in obtained network element node information. As another implementation, a location of the second core network device may be determined through an obtained DNAI of a data network (DN) connected to the second core network device, and/or a location of the first access network device may be determined through an identity of a tracking area or a registration area to which the first access network device belongs.

Alternatively, the location information of the network element node connected to the first path (including the location information of the second core network device and/or the location information of the first access network device) may be an approximate location of the network element node. In an actual disclosure, when it is hard for the first core network device to determine an actual geographic location of the second core network device, a location of another network element device associated with the second core network device may be used as an approximate location of the second core network device. For example, a location of a DN connected to the second core network device is used as the approximate location, that is, an identity (that is, a DNAI) of the DN may be used as the identity of the second core network device. Alternatively, for the first access network device, the tracking area or the registration area to which the first access network device belongs is used as an approximate location of the first access network device, or the identity of the tracking area or the registration area is used as an identity of the first access network device.

FIG. 3 is a schematic diagram of a logical relationship of a communications system architecture to which a data transmission control method is applied according to an embodiment of this disclosure. As shown in FIG. 3, the communications system architecture is an architecture of a 5G system, and may specifically include network element devices such as a UE, a (radio) access network ((R)AN), a UPF, a DN, an access and mobility management function (AMF), an SMF, an UDM, an AUSF, an NSSF, a PCF, and an AF. From a connection relationship in the figure, the UPF, used as a second core network device, is connected to the DN. Therefore, in some implementations, a location of the DN may be used as an approximate location of the second core network device, that is, a location of the second core network device is determined based on an identity (that is, a DNAI) of the DN.

In this embodiment, the first core network device may pre-configure a mapping relationship set according to the foregoing information, that is, different information or information combinations corresponds to one piece of first delay information. The first delay information may be determined or configured according to experiences or test results, and in an actual disclosure, may be implemented by pre-configuring a mapping relationship table. As an example, Table 1 is an example of determining the first delay information based on the DNAI and the tracking area (or registration area) identity (TAI). The first delay information may be determined according to a value of the DNAI and a value of the TAI.

TABLE 1

| DNAI | TAI | First delay information |
|---|---|---|
| DNAI = 001 | TAI = 001 | 1 ms for uplink data and 1.5 ms for downlink data |
| DNAI = 001 | TAI = 002 | 1 ms for both uplink data and downlink data |
| DNAI = 002 | TAI = 003 | 0.8 ms for both uplink data and downlink data |

The network status of the first path may be determined by determining whether a network status parameter meets a preset condition. As an implementation, when the network status parameter meets the preset condition, a first network state may be determined; when the network status parameter does not meet the preset condition, a second network state may be determined. As another implementation, when the network status parameter meets a first preset condition, the first network state may be determined; when the network status parameter meets a second preset condition, the second network state may be determined; when the network status parameter does not meet the first preset condition or the second preset condition, a third network state may be determined. As an example, the network status parameter may be specifically a transmission rate, and whether the network status parameter meets the preset condition may be specifically determined by determining whether the transmission rate is greater than a preset threshold. For example, when the transmission rate is greater than a first preset threshold, it is determined that the network status parameter meets the preset condition; when the transmission rate is equal to or less than the first preset threshold, it is determined that the network status parameter does not meet the preset condition. For another example, when the transmission rate is greater than the first preset threshold, it is determined that the network status parameter meets the first preset condition: when the transmission rate is equal to or less than a second preset threshold, it is determined that the network status parameter meets the second preset condition. Correspondingly, when the transmission rate is greater than the second preset condition and equal to or less than the first preset condition, it is determined that the network status parameter does not meet the first preset condition or the second preset condition. The first network state may be a network idle state, and the second network state may be a network busy state (or referred to as a network congested state).

For whether there is an intermediate second core network device on the first path (for example, whether there is an intermediate UPF entity on the first path), if there is an intermediate second core network device, data transmission includes receiving and sending of the intermediate second core network device, which takes certain time. Therefore, when the first delay information is determined, whether there is an intermediate second core network device on the first path may be considered.

Types of uplink data and downlink data transmitted on the first path respectively correspond to different delays. Generally, network states of the uplink data and the downlink data are different. For example, the uplink data presents less or weaker congestion than the downlink data, and as a result, a delay corresponding to the uplink data is less than a delay corresponding to the downlink data.

A network slice identification corresponding to the data transmitted on the first path may be represented by single-network slice selection assistance information (S-NSSAI). An S-NSSAI identifier and/or a DNN may be used to represent a service feature. The service feature may represent a service feature of a delay requirement. For example, if data corresponds to a service feature with a low delay requirement, a service with a low delay requirement may be represented by an S-NSSAI identifier and/or a DNN corresponding to the data.

In this embodiment, the first core network device may pre-configure a mapping relationship set according to the foregoing information, that is, different information or information combinations corresponds to one piece of first delay information. The first delay information may be determined or configured according to experiences or test results, and in an actual application, may be implemented by pre-configuring a mapping relationship table. For example, if the mapping relationship table may represent network element devices connected to the same first path (including the location of the second core network device and the location of the first access network device), two pieces of information and corresponding first delay information may be reflected in the table. For example, rows of the table may represent network states of the first path, and columns may represent service features corresponding to data transmitted on the first path. That is, the table represents corresponding first delay information when the second core network device is at a certain location, the first access network device is at another location, the network status is a certain state, and the service feature of the transmitted data is a certain feature.

In an optional embodiment of this disclosure, the sending, by a first core network device, first delay information to a first access network device includes: sending, by the first core network device, the first delay information to the first access network device through a third core network device.

In this embodiment, there is usually another core network device on a data transmission path between the first core network device and the first access network device. Taking an example that the first core network device is an SMF entity, and the first access network device is a base station, the data transmission path between the first core network device and the first access network device further includes at least an AMF entity, and the SMF entity sends the first delay information to the base station through the AMF entity. It may be understood that, the first core network device sends the first delay information to the first access network device through at least one third core network device.

In an optional embodiment of this disclosure, the sending, by a first core network device, first delay information to a first access network device includes at least one of the following: sending, by the first core network device, the first delay information to the first access network device through a first message in a protocol data unit (PDU) session establishment procedure; sending, by the first core network device, the first delay information to the first access network device through a second message in a PDU session modification procedure; sending, by the first core network device, the first delay information to the first access network device through a third message in a network registration procedure of a terminal device; or sending, by the first core network device, the first delay information to the first access network device through a fourth message in a switching procedure of an access network device to which the terminal device accesses.

The data transmission control method (that is, the first core network device sends the first delay information to the first access network device) of this embodiment of this disclosure may be performed in at least one of the PDU session establishment procedure, the PDU session modification procedure, the network registration procedure of the terminal device, and the access network device switching procedure. It may be understood that, in the foregoing procedure, the first delay information may be carried in any message sent by the first core network device to the first access network device; or the first delay information may be carried in any message sent by the first core network device through the third core network device to the first access network device.

In an optional embodiment of this disclosure, the method further includes: selecting, by the first core network device, the second core network device according to the first delay information.

In this embodiment, if the first delay information is not determined based on the location of the second core network device (for example, determined based on at least one item of the following information: the location of the first access network device, network devices on the first path, the type of the data transmitted on the first path, the service feature corresponding to the data transmitted on the first path, and the subscription policy of the terminal user, or in a default configuration), the first core network device may further select a second core network device based on the first delay information.

In an optional embodiment of this disclosure, the selecting, by the first core network device, the second core network device according to the first delay information includes determining, by the first core network device, location information of a to-be-selected second core network device according to the first delay information, and selecting the second core network device according to the location information of the to-be-selected second core network device.

Specifically, as shown in the architecture of FIG. 3, there may be a plurality of UPFs connected to the (R)AN. Only two are shown in the figure for example. Locations of different UPFs are different, that is, paths between the (R)AN and the UPFs are different, and distances of the paths between the (R)AN and the UPFs are different; and DNs connected to the UPFs are different. A UPF location range may be determined based on the first delay information, that is, at least one UPF is determined, and a UPF is selected from the at least one determined UPF. For example, a UPF closest to the base station may be selected from the at least one determined UPF.

As an implementation, the location information of the to-be-selected second core network device is determined based on a DNAI and/or an identity of the second core network device.

For example, referring to the example shown in Table 1, when the first delay information and the location of the first access network device are known (that is, the TAI is known), at least one DNAI corresponding to the second core network device may be determined. A DNAI is selected from the at least one DNAI corresponding to the second core network device, and the selected DNAI is used as the second core network device.

In an optional embodiment of this disclosure, the first delay information is determined based on delay information and second delay information, where the second delay information represents a delay in transmitting data between the first access network device and the terminal device; and the delay information represents a delay in transmitting data between the second core network device and the terminal device.

The delay information includes uplink delay information and/or downlink delay information of transmitting data between the second core network device and the terminal device; and/or the second delay information includes second uplink delay information and/or second downlink delay information of transmitting data between the first access network device and the terminal device.

In this embodiment, the first delay information is determined based on the delay information and the second delay information. The delay information may be specifically a PDB in QoS parameters; and the second delay information represents an air interface delay. In an actual application, the first delay information may be obtained by subtracting the second delay information from the PDB.

The second delay information is obtained by the first core network device from the first access network device. As an example, the first access network device estimates the second delay information, and sends the second delay information to the first core network device.

In an optional embodiment of this disclosure, the first core network device selects the second core network device based on third delay information, that is, selecting the UPF entity based on the third delay information. As an example, the first core network device may determine at least one item of the following information according to a delay length represented by the third delay information: an area range of a selectable second core network device, a network status of a path corresponding to the selectable second core network device, whether an intermediate second core network device is allowed to exist on the path corresponding to the selectable second core network device, a network slice identification and/or a DNN corresponding to data transmitted on the path corresponding to the selectable second core network device, and whether the data transmitted on the path corresponding to the selectable second core network device is uplink data or downlink data. The second core network device is selected based on the foregoing determined information.

For example, if a delay represented by the third delay information is relatively short, it may be determined that a distance between a location of the selectable second core network device and the location of the first access network device is relatively short. Alternatively, it may be determined that the path corresponding to the selectable second core network device is little congested (that is, in a relatively idle network state). Alternatively, it may be determined that the intermediate second core network device is not allowed to exist on the path corresponding to the selectable second core network device. Alternatively, it may be determined that the network slice identification and/or the DNN corresponding to the data transmitted on the path corresponding to the selectable second core network device represents that the transmitted data is data with a low delay requirement. Alternatively, it may be determined that the data transmitted on the path corresponding to the selectable second core network device is uplink data, or the like.

Through the technical solutions of this embodiment of this disclosure, the first core network device sends the first delay information representing the delay of the user plane data path between the second core network device and the first access network device to the first access network device, so that the first access network device determines, based on the first delay information, the second delay information representing the delay in transmitting data between the first access network device and the terminal device. In this way, an air interface transmission delay that is more close to an actual situation may be obtained, that is, a more accurate schedulable time for air interface transmission may be obtained. In addition, data transmission efficiency may be greatly improved.

An embodiment of this disclosure further provides a data transmission control method. FIG. 4 is a schematic flowchart of another data transmission control method according to an embodiment of this disclosure. As shown in FIG. 4, the method includes:

Step S21: A first access network device receives first delay information from a first core network device, where the first delay information includes a delay in transmitting data on a first path; and the first path is a user plane data path between a second core network device and the first access network device.

Step S22: The first access network device determines second delay information according to delay information corresponding to a data flow on the first path and the first delay information, where the delay information represents a delay in transmitting data between the second core network device and a terminal device, and the second delay information represents a delay in transmitting data between the first access network device and the terminal device.

In this embodiment, the first access network device may be any device in an access network. As an implementation, the first access network device may be a base station, for example, a gNB in a 5G system or an NR system. The first core network device may be any device in a core network. As an implementation, the first core network device may be an SMF entity.

In this embodiment, the first delay information represents the transmission delay on the first path; and the first path is the user plane data path between the second core network device and the first access network device. As an implementation, the second core network device may be an UPF entity. If the first access network device is a base station, the first path is a data transmission path between the UPF entity and the base station.

In this embodiment, the first delay information includes first uplink delay information and/or first downlink delay information of transmitting data on the first path. If the first path is the data transmission path between the UPF entity and the base station, the first uplink delay information is a delay in transmitting data from the base station to the UPF entity, and the first downlink delay information is a delay in transmitting data from the UPF entity to the base station.

Optionally, the receiving, by a first access network device, first delay information from a first core network device includes: receiving, by the first access network device, one piece of delay information from the first core network device when the first uplink delay information and the first downlink delay information are the same, where the one piece of delay information represents an uplink transmission delay and a downlink transmission delay in transmitting data on the first path.

It may be understood that, when the first uplink delay information and the first downlink delay information are the same, the first core network device sends only one piece of delay information to the first access network device, where the one piece of delay information represents the delay in transmitting data from the base station to the UPF entity and the delay in transmitting data from the UPF entity to the base station.

In an optional embodiment of this disclosure, the first delay information is determined according to at least one item of the following information: location information of the second core network device, location information of the first access network device, a network status of the first path, whether the data transmitted on the first path is uplink data or downlink data, a network slice identification and/or a DNN corresponding to the data transmitted on the first path, whether there is an intermediate second core network device on the first path, or a subscription policy.

In an optional embodiment of this disclosure, the location information of the second core network device is determined based on an identity of the second core network device and/or a DNAI; and the location information of the first access network device is determined based on an identity of the first access network device and/or an identity of a tracking area or a registration area to which the first access network device belongs.

In this embodiment, the location information of the second core network device may be represented by an approximate location of the second core network device. A location of another network element device associated with the second core network device may be used as the approximate location of the second core network device. For example, a location of a DN connected to the second core network device is used as the approximate location, that is, an identity (that is, a DNAI) of the DN may be used as the identity of the second core network device. The location information of the first access network device may be represented by an approximate location of the first access network device. The tracking area or the registration area to which the first access network device belongs is used as the approximate location of the first access network device, that is, the identity of the tracking area or the registration area is used as an identity of the first access network device.

In an optional embodiment of this disclosure, the first delay information is determined based on the delay information and the second delay information. The delay information may be specifically a PDB in QoS parameters; and the second delay information represents an air interface delay. In an actual application, the first delay information may be obtained by subtracting the second delay information from the PDB.

In an optional embodiment of this disclosure, the method further includes: sending, by the first access network device, the second delay information to the first core network device, so that the first core network device determines the first delay information based on the second delay information.

In this embodiment, the delay information includes uplink delay information and/or downlink delay information of transmitting data between the second core network device and the terminal device; and/or the second delay information includes second uplink delay information and/or second downlink delay information of transmitting data between the first access network device and the terminal device.

The delay information may be specifically a PDB in QoS parameters. For each terminal device, at least one PDU session may be established. Each PDU session may include a plurality of QoS flows (the QoS flows may be understood as data flows in this embodiment of this disclosure). Each QoS flow corresponds to a QoS parameter, that is, in this embodiment, the first access network device determines the second delay information according to a PDB corresponding to a data flow on the first path and the received first delay information. The second delay information represents a delay in transmitting data between the first access network device and the terminal device, that is, the second delay information represents an air interface delay. In an actual application, the second delay information may be obtained by subtracting the first delay information from the PDB. For example, the second uplink delay information is obtained by subtracting the first uplink delay information from the uplink delay information. For another example, the second downlink delay information is obtained by subtracting the second downlink delay information from the downlink delay information.

In an optional embodiment of this disclosure, the method further includes: sending, by the first access network device, the second delay information to the terminal device; or sending, by the first access network device, the second uplink delay information to the terminal device.

In this embodiment, the first access network device sends the second delay information (including the second uplink delay information and/or the second downlink delay information) to the terminal device, so that the terminal device performs scheduling for uplink data according to the second delay information. Alternatively, the first access network device sends only the second uplink delay information to the terminal device, so that the terminal device performs scheduling for uplink data according to the second uplink delay information.

In an optional embodiment of this disclosure, the method further includes: determining, by the first access network device, a scheduling policy according to the second delay information, and sending the scheduling policy to the terminal device.

In this implementation, the first access network device does not send the second delay information to the terminal device. Instead, the first access network device determines the scheduling policy according to the second delay information, and sends the scheduling policy to the terminal device, so that the terminal device transmits uplink data according to the scheduling policy. The scheduling policy enables the terminal device to transmit the uplink data and/or downlink data at a specific time point and/or time interval, where the time point is defined based on a subframe symbol of a specific radio frame.

In an actual application, the first access network device may choose whether to send the second delay information (or send the second uplink delay information) or send the scheduling policy to the terminal device according to an actual network condition and/or a capability of the terminal.

In an optional embodiment of this disclosure, if the first access network device does not receive the first delay information form the first core network device, the first access network device determines the second delay information according to delay information corresponding to the data flow on the first path and pre-configured default delay information. The default delay information is a pre-configured delay in transmitting data on the first path, and the default delay information may be, for example, 1 ms, 2 ms, or 10 ms. In an actual disclosure, the second delay information may be obtained by subtracting the default delay information from the delay information.

Through the technical solutions of this embodiment of this disclosure, the first core network device sends the first delay information representing the delay of the user plane data path between the second core network device and the first access network device to the first access network device, so that the first access network device determines, based on the first delay information, the second delay information representing the delay in transmitting data between the first access network device and the terminal device. In this way, an air interface transmission delay that is more close to an actual situation may be obtained, that is, a more accurate schedulable time for air interface transmission may be obtained. In addition, data transmission efficiency may be greatly improved.

An application scenario of the data transmission control method of this embodiment of this application is described below with reference to specific examples.

Figure 5B:
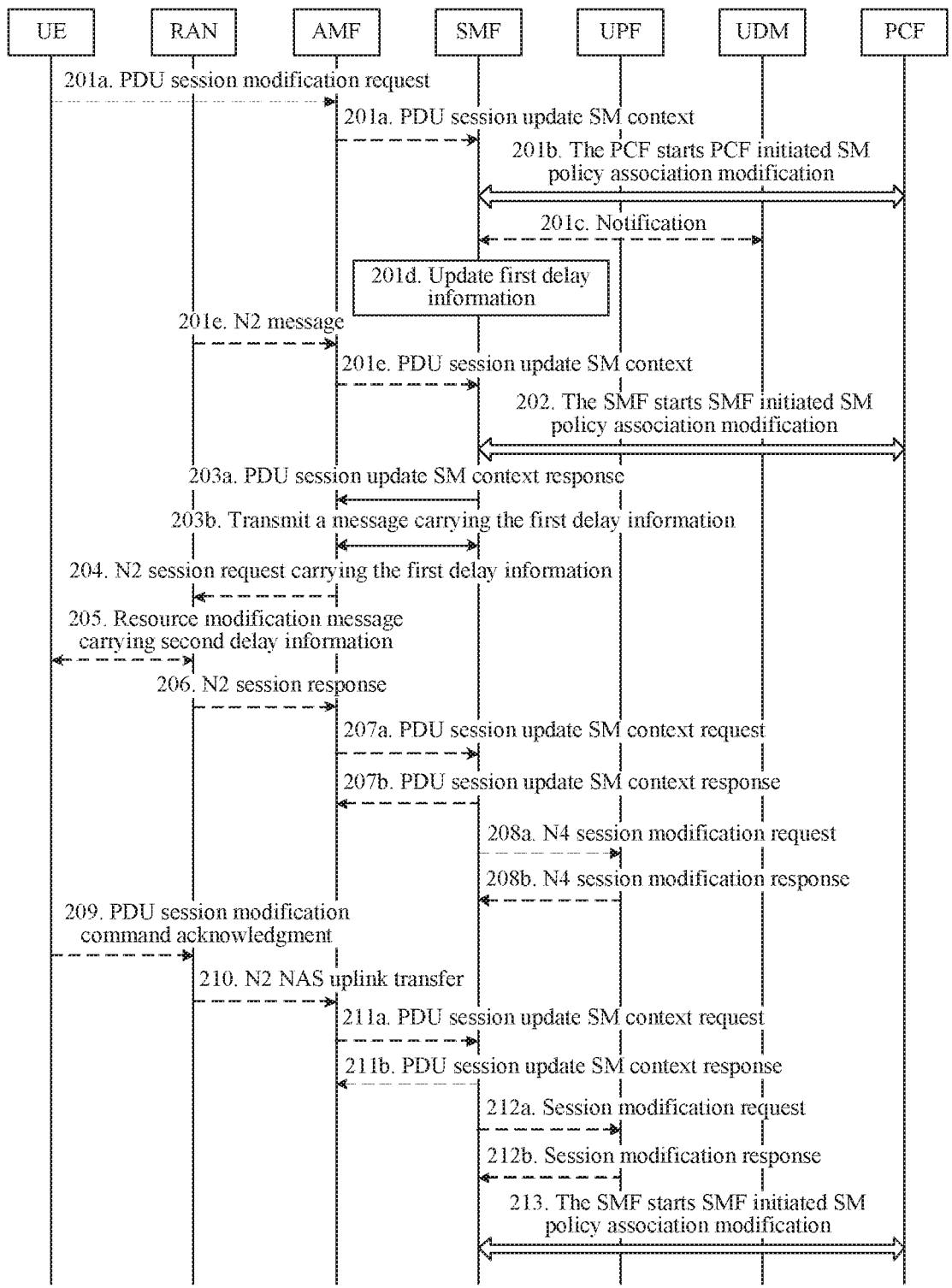
Figure 5C:
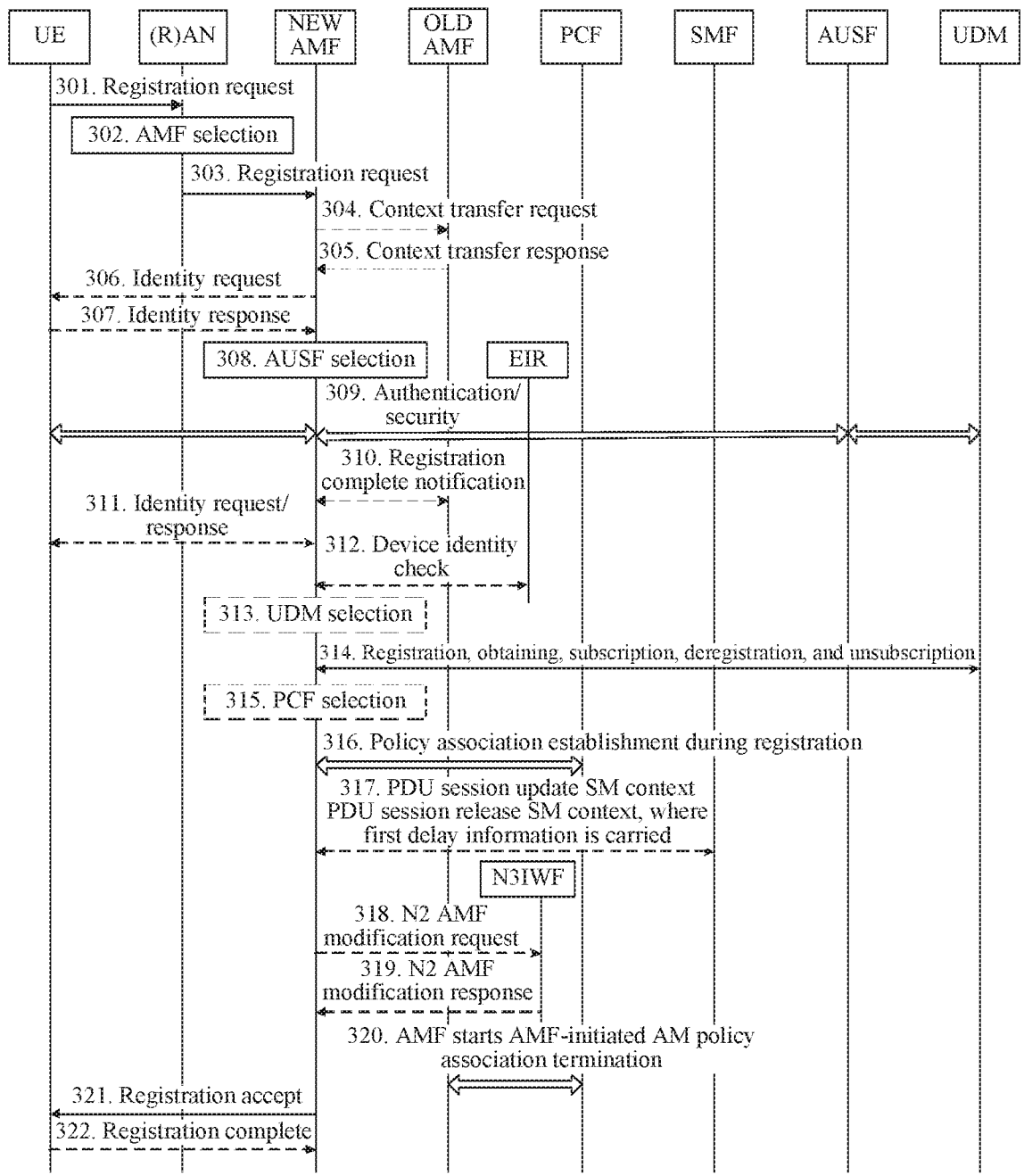

FIG. 5a to FIG. 5c are schematic diagrams of application processes of a data transmission control method according to an embodiment of this application. FIG. 5a represents that the data transmission control method of this embodiment of this application is applied to a PDU session establishment procedure. As shown in FIG. 5a, the process includes:

Step 101: A UE sends a PDU session establishment request to an AMF.

Step 102: The AMF performs SMF selection.

Step 103: The AMF initiates a context request (Nsmf_PDU Session_Create SMContext Request) to an SMF.

Steps 104a-b: Perform registration/subscription retrieval/subscription for updates between the SMF and a UDM.

Step 105: The SMF sends a context response (Nsmf_PDU Session_Create SMContext Response) to the AMF.

Step 106: Perform PDU session authentication/authorization.

Step 107a: The SMF performs PCF selection. Step 107b: Perform SM policy association establishment or SMF initiated SM policy association modification between the SMF and a PCF.

Step 108: The SMF performs UPF selection.

Step 109: The SMF starts SMF initiated SM policy association modification.

Steps 110a-b: The SMF sends an N4 session establishment/modification request to the UPF; and the UPF sends an N4 session establishment/modification response to the SMF.

Step 111: The SMF transmits a message (Namf_Communication_N1N2 Message Transfer) to the AMF, where the message carries first delay information.

Step 112: The AMF sends a PDU session request (N2 PDU Session Request) to an access network (for example, a base station), where the PDU session request carries the first delay information; and the access network determines second delay information based on the first delay information and a PDB in QoS parameters.

Step 113: The access network sends a resource setup message (AN-specific resource setup) to the UE, where the resource setup message carries the second delay information.

Step 114: The access network sends a PDU session request acknowledgment (N2 PDU Session Request Ack) to the AMF. Then, first uplink data is transmitted between the UE and the UPF.

Step 115: The AMF sends a context request (Nsmf_PDU Session_Update SMContext Request) to the SMF.

Steps 116a-b: The SMF sends a session modification request (N4 Session Modification Request) to the UPF; and the UPF sends a session modification response (N4 Session Modification Response) to the SMF. Before this step, first downlink data is transmitted between the UPF and the UE.

Step 117: The SMF sends a context response (Nsmf_PDU Session_Update SMContext Response) to the AMF.

Step 118: The SMF sends a context status notification (Nsmf_PDU Session_Update SMContextStatusNotify) to the AMF.

Step 119: The SMF sends an IPv6 address configuration message (IPv6 Address Configuration) to the UE.

Step 120: Perform unsubscription/deregistration between the SMF and the UDM.

FIG. 5b represents that the data transmission control method of this embodiment of this application is applied to a PDU session modification procedure. The procedure is caused by, for example, a network state change or a path change. As shown in FIG. 5b, the process includes:

Step 201a: A UE sends a PDU session modification request to an AMF, and the AMF sends a PDU session update SM context (Nsmf_PDU Session_Update SMContext) to the SMF.

Optionally, the PDU session modification request may carry a delay update identifier. Correspondingly, the PDU session update SM context may carry the delay update identifier. In this scenario, the UE triggers update of first delay information.

Steps 201b-d: The SMF performs PCF initiated SM policy association modification based on update of the PDU session, and notifies a UDM (Nudm_SDM_Notification). In this scenario, the SMF triggers update of the first delay information.

Step 201e: An access network (RAN) sends an N2 message to the AMF, where the N2 message carries a PDU session identifier (PDU Session ID) and SM information, and the AMF sends the PDU session update SM context (Nsmf_PDU Session_Update SMContext) to the SMF.

Step 202: The SMF starts SMF initiated SM policy association modification.

Steps 203a-b: The SMF sends a PDU session update SM context response (Response of Nsmf_PDU Session_Update SM Context) to the AMF, and the SMF transmits a message (Namf_Communication_N1N2 Message Transfer) to the AMF, where the message carries the first delay information.

Step 204: The AMF sends an N2 session request (N2 PDU Session Request) to the access network, where the request carries the first delay information; and the access network determines second delay information based on the first delay information and a PDB in QoS parameters.

Step 205: The access network sends a resource modification message (AN-specific resource modification) to the UE, where the message carries the second delay information.

Step 206: The access network sends an N2 session response to the AMF.

Steps 207a-b: The AMF sends a PDU session update SM context request (Nsmf_PDU Session_Update SMContext Request) to the SMF; and the SMF sends a PDU session update SM context response (Nsmf_PDU Session_Update SMContext Response) to the AMF.

Steps 208a-b: The SMF sends an N4 session modification request to the UPF; and the UPF sends an N4 session modification response to the SMF.

Step 209: The UE sends a PDU session modification command acknowledgment message (PDU Session Modification Command Ack).

Step 210: The access network performs N2 NAS uplink transfer to the AMF.

Steps 211a-b: The AMF sends a PDU session update SM context request (Nsmf_PDU Session_Update SMContext Request) to the SMF; and the SMF sends a PDU session update SM context response (Nsmf_PDU Session_Update SMContext Response) to the AMF.

Steps 212a-b: The SMF sends a session modification request to the UPF; and the UPF sends a session modification response to the SMF.

Step 213: The SMF starts SMF initiated SM policy association modification.

FIG. 5c represents that the data transmission control method of this embodiment of this application is applied to a network registration procedure of a terminal device, for example, a registration update procedure, or migration of a terminal device in an idle state from an EPS to a 5GS. This example may include an old AMF before update (or before switching, or before migration), and a new AMF after update (or after switching, or after migration). As shown in FIG. 5c, the process includes:

Step 301: A UE initiates a registration request to an access network.

Step 302: The access network performs AMF selection.

Step 303: The access network initiates a registration request to the new AMF.

Steps 304-305: The new AMF sends context transfer request (Nsmf_Communication_UE ContextTransfer) to the old SMF; and the old AMF sends a context transfer response (Nsmf_Communication_UE ContextTransfer Response) to the new AMF.

Steps 306-307: The new AMF sends an identity request to the UE, and the UE send an identity response to the new AMF.

Step 308: The new AMF performs AUSF selection.

Step 309: Perform an authentication/security process.

Step 310: Transmit a registration complete notification (Nsmf_Communication_RegistrationCompleteNotify) between the new AMF and the old AMF.

Step 311: Transmit an identity request/response between the new AMF and the old AMF.

Step 312: Transmit a device identity check (N5g-EIR_Equipment IdentityCheck_Get) between the new AMF and an EIR.

Step 313: The new AMF performs UDM selection.

Step 314: Perform processes such as registration (Nudm_UECM_Registration), obtaining (Nudm_SDM_Get), subscription (Nudm_SDM_Subscribe), deregistration (Nudm_UCM_DeregistrationNotify), and unsubscription (Nudm_SDM_Unsubscribe) between the new AMF and a UDM.

Step 315: The new AMF performs PCF selection.

Step 316: The new AMF performs policy association establishment during registration (AM Policy Association Establishment during Registration) between the new AMF and a PCF.

Step 317: Transmit a PDU session update SM context (Nsmf_PDU Session_Update SMContext) and a PDU session release SM context (Nsmf_PDU Session_Release SMContext) between the SMF and the new AMF, where a message sent by the SMF to the new AMF carries first delay information.

Steps 318-319: The new AMF sends an N2 AMF modification request (N2 AMF Mobility Request) to an N3IWF; and the N3IWF sends an N2 AMF modification response (N2 AMF Mobility Response) to the new AMF.

Step 320: Transmit AMF-initiated AM policy association termination between the PCF and the old AMF.

Steps 321-322: The new AMF sends registration accept to the UE; and the UE sends registration complete to the new AMF.

Figure 6:
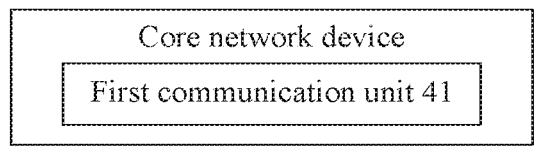
FIG. 6 is a schematic block diagram of a core network device according to an embodiment of this disclosure.

An embodiment of this application further provides a core network device. The core network device is a first core network device. FIG. 6 is a schematic block diagram of a core network device according to an embodiment of this application. As shown in FIG. 6, the core network device includes: a first communication unit 41, configured to send first delay information to a first access network device, where the first delay information represents a delay in transmitting data on a first path; and the first path is a user plane data path between a second core network device and the first access network device.

In an optional embodiment of this application, the first delay information includes first uplink delay information and/or first downlink delay information of transmitting data on the first path.

Optionally, the first communication unit 41 is configured to send one piece of delay information to the first access network device when the first uplink delay information and the first downlink delay information are the same, where the one piece of delay information represents an uplink transmission delay and a downlink transmission delay in transmitting data on the first path.

Figure 7:
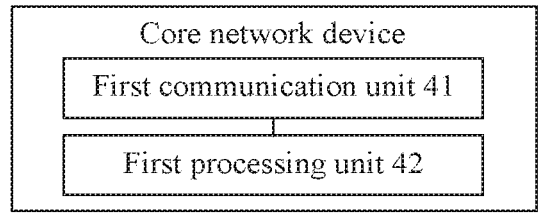
FIG. 7 is a schematic block diagram of another core network device according to an embodiment of this disclosure.

In an optional embodiment of this application, as shown in FIG. 7, the core network device further includes a first processing unit 42, configured to determine the first delay information before the first communication unit 41 sends the first delay information to the first access network device.

The first delay information is determined according to at least one item of the following information: location information of the second core network device, location information of the first access network device, a TAI corresponding to the first access network device, a network status of the first path, whether data transmitted on the first path is uplink data or downlink data, a network slice identification and/or a DNN corresponding to the data transmitted on the first path, whether there is an intermediate second core network device on the first path, or a subscription policy. Optionally, the location information of the second core network device is determined based on an identity of the second core network device and/or a DNAI; and the location information of the first access network device is determined based on an identity of the first access network device and/or an identity of a tracking area or a registration area to which the first access network device belongs.

In an optional embodiment of this application, the first communication unit 41 is configured to send the first delay information to the first access network device in at least one of the following manners: sending the first delay information to the first access network device through a first message in a PDU session establishment procedure; sending the first delay information to the first access network device through a second message in a PDU session modification procedure; sending the first delay information to the first access network device through a third message in a network registration procedure of a terminal device; or sending the first delay information to the first access network device through a fourth message in a switching procedure of an access network device to which the terminal device accesses.

In an optional embodiment of this application, the first communication unit 41 is configured to send the first delay information to the first access network device through a third core network device.

In an optional embodiment of this application, the first processing unit 42 is further configured to select the second core network device according to the first delay information.

In an optional embodiment of this application, the first processing unit 42 is configured to determine location information of a to-be-selected second core network device according to the first delay information, and select the second core network device according to the location information of the to-be-selected second core network device.

In an optional embodiment of this application, the location information of the to-be-selected second core network device is determined based on a DNAI and/or an identity of the second core network device.

In an optional embodiment of this application, the first delay information is determined based on delay information and second delay information, where the second delay information represents a delay in transmitting data between the first access network device and the terminal device; and the delay information represents a delay in transmitting data between the second core network device and the terminal device.

In an optional embodiment of this application, the delay information includes uplink delay information and/or downlink delay information of transmitting data between the second core network device and the terminal device; and/or the second delay information includes second uplink delay information and/or second downlink delay information of transmitting data between the first access network device and the terminal device.

In an optional embodiment of this application, the first communication unit 41 is further configured to obtain the second delay information from the first access network device.

Figure 8:
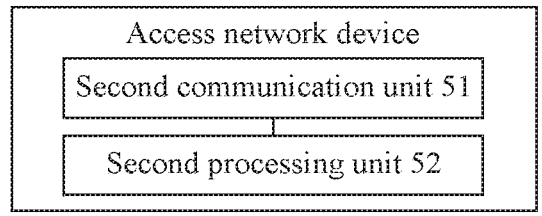
FIG. 8 is a schematic block diagram of an access network device according to an embodiment of this disclosure.

An embodiment of this application further provides an access network device. FIG. 8 is a schematic block diagram of an access network device according to an embodiment of this application. As shown in FIG. 8, the access network device includes: a second communication unit 51 and a second processing unit 52, where the second communication unit 51 is configured to receive first delay information from a first core network device, where the first delay information includes a delay in transmitting data on a first path; and the first path is a user plane data path between a second core network device and the first access network device; and the second processing unit 52 is configured to determine second delay information according to delay information corresponding to a data flow on the first path and the first delay information received by the second communication unit 51 where the delay information represents a delay in transmitting data between the second core network device and a terminal device, and the second delay information represents a delay in transmitting data between the first access network device and the terminal device.

In an optional embodiment of this application, the first delay information includes first uplink delay information and/or first downlink delay information of transmitting data on the first path.

Optionally, the second communication unit 51 is configured to receive one piece of delay information from the first core network device when the first uplink delay information and the first downlink delay information are the same, where the one piece of delay information represents an uplink transmission delay and a downlink transmission delay in transmitting data on the first path.

In an optional embodiment of this application, the delay information includes uplink delay information and/or downlink delay information of transmitting data between the second core network device and the terminal device; and/or the second delay information includes second uplink delay information and/or second downlink delay information of transmitting data between the first access network device and the terminal device.

In an optional embodiment of this application, the second communication unit 51 is further configured to send the second delay information to the terminal device; or send the second uplink delay information to the terminal device.

In an optional embodiment of this application, the second processing unit 52 is further configured to determine a scheduling policy according to the second delay information; and the second communication unit 51 is further configured to send the scheduling policy determined by the second processing unit 52 to the terminal device. The scheduling policy is used to enable the terminal device to transmit uplink data and/or downlink data at a specific time point and/or time interval, where the time point is defined based on a subframe symbol of a specific radio frame.

In an optional embodiment of this application, the first delay information is determined based on the delay information and the second delay information.

In an optional embodiment of this application, the second communication unit 51 is further configured to send the second delay information to the first core network device.

An embodiment of this application further provides a device selection method. The method includes:

Step S31: A first core network device selects a second core network device according to third delay information, where the third delay information represents a delay in transmitting data on a second path; and the second path is a user plane data path between the second core network device and a first access network device, or the second path is a user plane data path between the second core network device and a terminal device.

In this embodiment, the first core network device may be any device in a core network. As an implementation, the first core network device may be an SMF entity. The first access network device may be any device in an access network. As an implementation, the first access network device may be a base station, for example, a gNB in a 5G system or an NR system.

The third delay information represents the transmission delay on the second path; the second path may be the user plane data path between the second core network device and the first access network device, or the user plane data path between the second core network device and the terminal device. As an implementation, the second core network device may be an UPF entity. In this case, the second path may be a data transmission path between the UPF entity and the base station, or a data transmission path between the UPF entity and the terminal device (that is, a terminal).

In this embodiment, the third delay information includes third uplink delay information and/or third downlink delay information of transmitting data on the second path.

In an optional embodiment of this application, the selecting, by a first core network device, a second core network device according to third delay information includes determining, by the first core network device, location information of a to-be-selected second core network device according to the third delay information, and selecting the second core network device according to the location information of the to-be-selected second core network device.

Specifically, as shown in the architecture of FIG. 3, there may be a plurality of UPFs connected to an (R)AN. Only two are shown in the figure for example. Locations of different UPFs are different, that is, paths between the (R)AN and the UPFs are different, and distances of the paths between the (R)AN and the UPFs are different; and DNs connected to the UPFs are different. A UPF location range may be determined based on the first delay information, that is, at least one UPF is determined, and a UPF is selected from the at least one determined UPF. For example, a UPF closest to the base station may be selected from the at least one determined UPF.

In an optional embodiment of this application, the location information of the to-be-selected second core network device is determined based on a DNAI and/or an identity of the second core network device.

For example, referring to the example shown in Table 1, assuming that the first delay information in Table 1 is the third delay information in this embodiment, when the third delay information and the location of the first access network device are known (that is, the TAI is known), at least one DNAI corresponding to the second core network device may be determined. A DNAI is selected from the at least one DNAI corresponding to the second core network device, and the selected DNAI is used as the second core network device.

In an optional embodiment of this application, the third delay information is determined based on second delay information; and the second delay information represents a delay in transmitting data between the first access network device and the terminal device. Optionally, the second delay information includes second uplink delay information and/or second downlink delay information of transmitting data between the first access network device and the terminal device. In this embodiment, the third delay information is determined based on the delay information and the second delay information. The delay information may be specifically a PDB in QoS parameters; and the second delay information represents an air interface delay. In an actual application, the third delay information may be obtained by subtracting the second delay information from the PDB.

In an optional embodiment of this application, the second delay information is obtained by the first core network device from the first access network device. As an example, the first access network device estimates the second delay information, and sends the second delay information to the first core network device.

In an optional embodiment of this application, the first core network device selects the second core network device based on the third delay information, that is, selecting the UPF entity based on the third delay information. As an example, the first core network device may determine at least one item of the following information according to a delay length represented by the third delay information: an area range of a selectable second core network device, a network status of a path corresponding to the selectable second core network device, whether an intermediate second core network device is allowed to exist on the path corresponding to the selectable second core network device, a network slice identification and/or a DNN corresponding to data transmitted on the path corresponding to the selectable second core network device, and whether the data transmitted on the path corresponding to the selectable second core network device is uplink data or downlink data. The second core network device is selected based on the foregoing determined information.

For example, if a delay represented by the third delay information is relatively short, it may be determined that a distance between a location of the selectable second core network device and the location of the first access network device is relatively short. Alternatively, it may be determined that the path corresponding to the selectable second core network device is little congested (that is, in a relatively idle network state). Alternatively, it may be determined that the intermediate second core network device is not allowed to exist on the path corresponding to the selectable second core network device. Alternatively, it may be determined that the network slice identification and/or the DNN corresponding to the data transmitted on the path corresponding to the selectable second core network device represents that the transmitted data is data with a low delay requirement. Alternatively, it may be determined that the data transmitted on the path corresponding to the selectable second core network device is uplink data, or the like.

Specifically, as shown in the architecture of FIG. 3, there may be a plurality of UPFs connected to an (R)AN. Only two are shown in the figure for example. Locations of different UPFs are different, that is, paths between the (R)AN and the UPFs are different, and distances of the paths between the (R)AN and the UPFs are different; and DNs connected to the UPFs are different. A range of the UPF may be determined based on the third delay information, that is, at least one UPF is determined, and a UPF is selected from the at least one determined UPF. For example, a UPF closest to the base station may be selected from the at least one determined UPF.

In an optional embodiment of this application, before the selecting, by a first core network device, a second core network device according to third delay information, the method further includes: determining, by the first core network device, the third delay information according to subscription information, where the first core network device pre-configures the subscription information; or the first core network device obtains the subscription information from another core network device.

It may be understood that, the third delay information determined based on the subscription information represents a data transmission delay allowed on the second path, that is, data transmission delay allowed between the second core network device and the first access network device, or a data transmission delay between the second core network device and the terminal device.

An embodiment of this application further provides a core network device. The core network device is a first core network device, and includes a selection unit, configured to select a second core network device according to third delay information, where the third delay information represents a delay in transmitting data on a second path; and the second path is a user plane data path between the second core network device and a first access network device, or the second path is a user plane data path between the second core network device and a terminal device.

In this embodiment, the third delay information includes third uplink delay information and/or third downlink delay information of transmitting data on the second path.

In an optional embodiment of this application, the core network device further includes a determining unit, configured to determine the third delay information according to subscription information before the selection unit selects the second core network device according to the third delay information.

In an optional embodiment of this application, the selection unit is configured to determine location information of a to-be-selected second core network device according to the third delay information, and select the second core network device according to the location information of the to-be-selected second core network device.

In an optional embodiment of this application, the location information of the to-be-selected second core network device is determined based on a DNAI and/or an identity of the second core network device.

In an optional embodiment of this application, the third delay information is determined based on second delay information; and the second delay information represents a delay in transmitting data between the first access network device and the terminal device.

Optionally, the second delay information includes second uplink delay information and/or second downlink delay information of transmitting data between the first access network device and the terminal device.

In an optional embodiment of this application, the core network device further includes a third communication unit, configured to obtain the second delay information from the first access network device.

Figure 9:
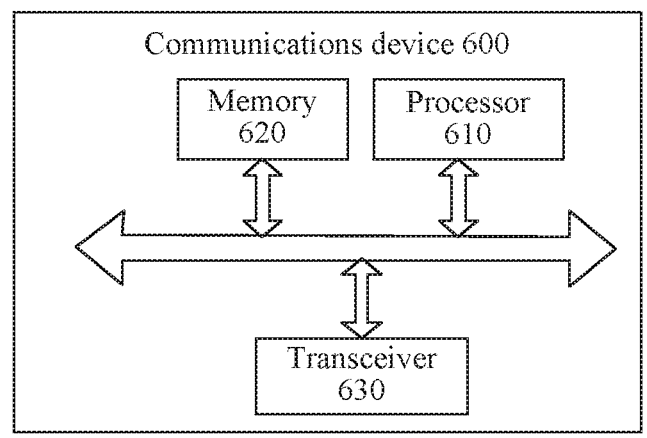
FIG. 9 is a schematic diagram of a hardware structure of a communications device according to an embodiment of this disclosure.

FIG. 9 is a schematic diagram of a hardware structure of a communications device according to an embodiment of this application. A communications device 600 shown in FIG. 9 includes a processor 610. The processor 610 may invoke a computer program from a memory and run the computer program, to implement the methods in the embodiments of this application.

Optionally, as shown in FIG. 9, the communications device 600 may further include a memory 620. The processor 610 may invoke the computer program from the memory 620 and run the computer program, to implement the methods in the embodiments of this application. The memory 620 may be a separate component independent of the processor 610, or may be integrated into the processor 610.

Optionally, as shown in FIG. 9, the communications device 600 may further include a transceiver 630. The processor 610 may control the transceiver 630 to communicate with another device. Specifically, the transceiver 630 may send information or data to the another device, or receive information or data from the another device. The transceiver 630 may include a transmitter and a receiver. The transceiver 630 may further include one or more antennas.

Optionally, the communications device 600 may be specifically the core network device in the embodiments of this disclosure, and the communications device 600 can implement corresponding procedures implemented by the core network device in the data transmission control method or the device selection methods in the embodiments of this disclosure. For brevity, details are not described herein again. Optionally, the communications device 600 may be the access network device in the embodiments of this disclosure, and the communications device 600 can implement corresponding procedures implemented by the access network device in the methods in the embodiments of this disclosure. For brevity, details are not described herein again.

Figure 10:
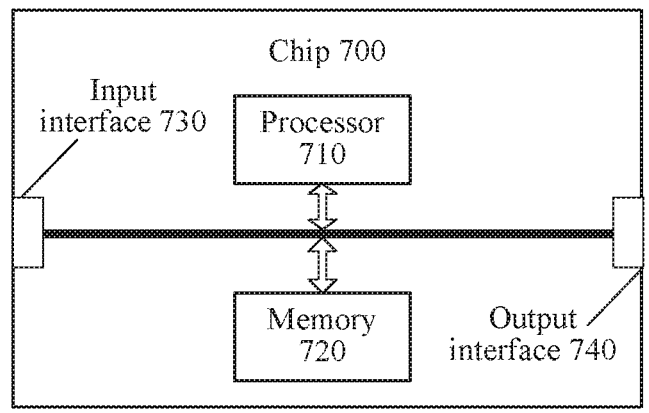
FIG. 10 is a schematic block diagram of a chip according to an embodiment of this disclosure.

FIG. 10 is a schematic structural diagram of a chip according to an embodiment of this disclosure. A chip 700 shown in FIG. 10 includes a processor 710. The processor 710 may invoke a computer program from a memory and run the computer program, to implement the methods in the embodiments of this disclosure.

Optionally, as shown in FIG. 10, the chip 700 may further include a memory 720. The processor 710 may invoke the computer program from the memory 720 and run the computer program, to implement the methods in the embodiments of this disclosure. The memory 720 may be a separate component independent of the processor 710, or may be integrated into the processor 710.

Optionally, the chip 700 may further include an input interface 730. The processor 710 may control the input interface 730 to communicate with another device or chip, and specifically, may obtain information or data sent by the another device or chip.

Optionally, the chip 700 may further include an output interface 740. The processor 710 may control the output interface 740 to communicate with another device or chip, and specifically, may output information or data to the another device or chip.

Optionally, the chip may be applied to the core network device in the embodiments of this disclosure, and the chip can implement corresponding procedures implemented by the core network device in the data transmission control method or the device selection method in the embodiments of this disclosure. For brevity, details are not described herein again.

Optionally, the chip may be applied to the access network device in the embodiments of this disclosure, and the chip can implement corresponding procedures implemented by the access network device in the methods in the embodiments of this disclosure. For brevity, details are not described herein again. It should be noted that, the chip mentioned in the embodiments of this disclosure may also be referred to as a system-level chip, a system chip, a chip system, a system on chip, or the like.

It should be understood that, the processor of this embodiment of this disclosure may be an integrated circuit chip, and has a signal processing capability. During implementation, the steps of the foregoing method embodiments may be implemented by using a hardware integrated logic circuit in the processor or implemented by using an instruction in a software form. The foregoing processor may be a general-purpose processor, a digital signal processor (DSP), an application-specific integrated circuit (ASIC), a field programmable gate array (FPGA), or another programmable logical device, discrete gate or transistor logical device, or discrete hardware component. The processor 1301 may implement or perform the methods, the steps, and logical block diagrams that are disclosed in the embodiments of this disclosure. The general-purpose processor may be a microprocessor, or the processor may be any conventional processor or the like. Steps of the methods disclosed with reference to the embodiments of this disclosure may be directly performed and completed by using a hardware decoding processor, or may be performed and completed by using a combination of hardware and a software module in the decoding processor. The software module may be located in a mature storage medium in the art, such as a random access memory (RAM), a flash memory, a read-only memory (ROM), a programmable ROM (PROM), an electrically erasable programmable memory, or a register. The storage medium is located in the memory, and the processor reads information in the memory and completes the steps in the foregoing methods in combination with hardware of the processor.

It can be understood that, the memory in the embodiments of this disclosure may be a volatile memory or a non-volatile memory, or may include both a volatile memory and a non-volatile memory. The non-volatile memory may be a ROM, a PROM, an erasable PROM (EPROM), an electrically EPROM (EEPROM), or a flash memory. The volatile memory may be a RAM, used as an external cache. Through exemplary but not limitative description, many forms of RAMs may be used, for example, a static RAM (SRAM), a dynamic RAM (DRAM), a synchronous DRAM (SDRAM), a double data rate SDRAM (DDR SDRAM), an enhanced SDRAM (ESDRAM), a synchlink DRAM (SL DRAM) and a direct rambus RAM (DR RAM). It should be noted that, the memory for the system and the method described herein aims to include but not limited to these memories and any other suitable types of memories.

It should be understood that, the memory is an example but is not intended for limitation. For example, the memory in the embodiments of this disclosure may alternatively be an SRAM, a DRAM, an SDRAM, a DDR SDRAM, an ESDRAM, an SLDRAM, a DR RAM, or the like. That is, the memory in this embodiment of this disclosure aims to include but is not limited to these memories and any other suitable type of memory.

An embodiment of this disclosure further provides a computer readable storage medium, configured to store a computer program.

Optionally, the computer readable storage medium may be applied to the core network device in the embodiments of this disclosure, and the computer program enables a computer to implement corresponding procedures implemented by the core network device in the data transmission control method or the device selection method in the embodiments of this disclosure. For brevity, details are not described herein again. Optionally, the computer readable storage medium may be applied to the access network device in the embodiments of this disclosure, and the computer program enables a computer to implement corresponding procedures implemented by the access network device in the methods in the embodiments of this disclosure. For brevity, details are not described herein again.

An embodiment of this disclosure further provides a computer program product, including a computer program instruction.

Optionally, the computer program product may be applied to the core network device in the embodiments of this disclosure, and the computer program instruction enables a computer to implement corresponding procedures implemented by the core network device in the data transmission control method or the device selection method in the embodiments of this disclosure. For brevity, details are not described herein again. Optionally, the computer program product may be applied to the access network device in the embodiments of this disclosure, and the computer program instruction enables a computer to implement corresponding procedures implemented by the access network device in the methods in the embodiments of this disclosure. For brevity, details are not described herein again.

An embodiment of this disclosure further provides a computer program.

Optionally, the computer program may be applied to the core network device in the embodiments of this disclosure, and the computer program, when run on a computer, enables the computer to implement corresponding procedures implemented by the core network device in the data transmission control method or the device selection method in the embodiments of this disclosure. For brevity, details are not described herein again. Optionally, the computer program may be applied to the access network device in the embodiments of this disclosure, and the computer program, when run on a computer, enables the computer to implement corresponding procedures implemented by the access network device in the methods in the embodiments of this disclosure. For brevity, details are not described herein again.

A person of ordinary skill in the art may notice that the exemplary units and algorithm steps described with reference to the embodiments disclosed in this specification can be implemented in electronic hardware, or a combination of computer software and electronic hardware. Whether the functions are executed in a mode of hardware or software depends on particular applications and design constraint conditions of the technical solutions. A person skilled in the art may use different methods to implement the described functions for each particular application, but it should not be considered that the implementation goes beyond the scope of the present application.

A person skilled in the art may clearly understand that, for simple and clear description, for specific work processes of the foregoing described system, apparatus, and unit, reference may be made to corresponding process in the foregoing method embodiments, and details are not described herein again.

In the several embodiments provided in this disclosure, it should be understood that the disclosed system, apparatus, and method may be implemented in other manners. For example, the described apparatus embodiment is merely an example. For example, the unit division is merely logical function division and may be other division during actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual requirements to achieve the objectives of the solutions of the embodiments.

In addition, functional units in the embodiments of this disclosure may be integrated into one processing unit, or each of the units may exist alone physically, or two or more units are integrated into one unit.

If implemented in the form of software functional units and sold or used as an independent product, the functions may also be stored in a computer-readable storage medium. Based on such an understanding, the technical solutions of this disclosure essentially, or the part contributing to the prior art, or part of the technical solutions may be implemented in the form of a software product. The computer software product is stored in a storage medium, and includes several instructions for instructing a computer device (which may be a personal computer, a server, a network device, or the like) to perform all or some of the steps of the method described in the embodiment of this disclosure. The foregoing storage medium includes: any medium that can store program codes, such as a USB flash disk, a removable hard disk, a read-only memory (ROM), a RAM (RAM), a magnetic disk, or an optical disk.

The descriptions are only specific implementations of this disclosure, but are not intended to limit the protection scope of this disclosure. Any variation or replacement readily figured out by persons skilled in the art within the technical scope disclosed in this disclosure shall fall within the protection scope of this disclosure. Therefore, the protection scope of this disclosure shall be subject to the protection scope of the claims.

The invention claimed is:

1. A data transmission control method, comprising:
    receiving, by a first access network device, first delay information from a first core network device, wherein the first delay information represents a delay in transmitting data on a first path, and the first path is a user plane data path between a second core network device and the first access network device; and
    determining, by the first access network device, second delay information according to third delay information and the first delay information, wherein the third delay information represents a delay in transmitting, via the first access network device, data between the second core network device and a terminal device, and the second delay information represents a delay in transmitting data between the first access network device and the terminal device; and
    sednding , by the first access network device, the second delay information to the terminal device,
    wherein the second delay information comprises second uplink delay information and/or second downlink delay information of transmitting data between the first access network device and the terminal device; and
    wherein the terminal device performs scheduling based on the second delay information.

2. The method according to claim 1, wherein the first delay information comprises first uplink delay information and/or first downlink delay information of transmitting data on the first path.

3. The method according to claim 2, wherein the receiving, by a first access network device, first delay information from a first core network device comprises:
receiving, by the first access network device, one piece of delay information from the first core network device when the first uplink delay information and the first downlink delay information are the same, wherein the one piece of delay information represents an uplink transmission delay and a downlink transmission delay in transmitting data on the first path.

4. The method according to claim 1, wherein the third delay information comprises third uplink delay information and/or third downlink delay information of transmitting data between the second core network device and the terminal device.

5. A system, comprising:
a first access network device;
a terminal device, and core network device, used as a first core network device, the core netowrk device comprising: a transceiver, configured to send first delay information to the first access network device, wherein the first delay information represents a delay in transmitting data on a first path, and the first path is a user plane data path between a second core network device and the first access network device;
wherein third delay information and the first delay information are used to determine second delay information, wherein the third delay information represents a delay in transmitting, via the first access network device, data between the second core network device and the terminal device, and the second delay information represents a delay in transmitting data between the first access network device and the terminal device;
wherein the second delay information comprises second uplink delay information and/or second downlink delay information of transmitting data between the first access network device and the terminal device;
wherein the second delay information is sent by the first access network device to the terminal device and
wherein the terminal device performs scheduling based on the second delay information.

6. The system according to claim 5, wherein the first delay information comprises first uplink delay information and/or first downlink delay information of transmitting data on the first path.

7. The system according to claim 5, wherein the first delay information comprises first delay information corresponding to different Quality of service (QoS) flow.

8. The system according to claim 5, wherein the second core network device is a user plane function entity, and the first access network device is a base station.

9. The system according to claim 5, where the core network device further comprising a processor, configured to determine the first delay information before the transceiver sends the first delay information to the first access network device, wherein the first delay information is determined according to at least one item of the following information:
location information of the second core network device, location information of the first access network device, a network status of the first path, whether the data transmitted on the first path is uplink data or downlink data, a service feature corresponding to the data transmitted on the first path, whether there is an intermediate second core network device on the first path, or a subscription policy.

10. The system according to claim 9, wherein the location information of the second core network device is determined based on an identity of the second core network device and/or a data network access identity (DNAI); and the location information of the first access network device is determined based on an identity of the first access network device and/or an identity of a tracking area or a registration area to which the first access network device belongs.

11. The system according to claim 5, wherein the transceiver is configured to send the first delay information to the first access network device in at least one of the following manners: sending the first delay information to the first access network device through a first message in a protocol data unit (PDU) session establishment procedure; sending the first delay information to the first access network device through a second message in a PDU session modification procedure; sending the first delay information to the first access network device through a third message in a network registration procedure of a terminal device; or sending the first delay information to the first access network device through a fourth message in a switching procedure of an access network device to which the terminal device accesses.

12. The system according to claim 5, wherein the transceiver is configured to send the first delay information to the first access network device through a third core network device.

13. An access network device, comprising: a transceiver and a processor, wherein
the transceiver is configured to receive first delay information from a first core network device, wherein the first delay information represents a delay in transmitting data on a first path, and the first path is a user plane data path between a second core network device and the first access network device; and
the processor is configured to determine second delay information according to third delay information and the first delay information received by the transceiver, wherein the third delay information represents a delay in transmitting, via the first access network device, data between the second core network device and a terminal device, and the second delay information represents a delay in transmitting data between the first access network device and the terminal device;
wherein the second delay information comprises second uplink delay information and/or second downlink delay information of transmitting data between the first access network device and the terminal device;
wherein the transceiver is further configured to send the second delay information to the terminal device;
wherein the terminal device performs scheduling based on the second delay information.

14. The access network device according to claim 13, wherein the first delay information comprises first uplink delay information and/or first downlink delay information of transmitting data on the first path.

15. The access network device according to claim 14, wherein the transceiver is configured to receive one piece of delay information from the first core network device when the first uplink delay information and the first downlink delay information are the same, wherein the one piece of delay information represents an uplink transmission delay and a downlink transmission delay in transmitting data on the first path.

16. The access network device according to claim 13, wherein the third delay information comprises third uplink delay information and/or third downlink delay information of transmitting data between the second core network device and the terminal device.

17. The access network device according to claim 13, wherein the processor is further configured to determine a scheduling policy according to the second delay information; and the transceiver is further configured to send the scheduling policy determined by the processor to the terminal device.

18. The access network device according to claim 17, wherein the scheduling policy is used to enable the terminal device to transmit uplink data and/or downlink data at a specific time point and/or time interval, wherein the time point is defined based on a subframe symbol of a specific radio frame.

* * * * *